Sept. 18, 1962 A. J. EVANS 3,054,157
END CONNECTOR FOR MOLDED BEADS
Filed Dec. 9, 1959

INVENTOR.
ANDREW J. EVANS
BY
ATTORNEY

United States Patent Office 3,054,157
Patented Sept. 18, 1962

3,054,157
END CONNECTOR FOR MOLDED BEADS
Andrew J. Evans, Greenville, R.I., assignor to E. A. Adams & Son, Inc., Providence, R.I., a corporation of Rhode Island
Filed Dec. 9, 1959, Ser. No. 858,474
4 Claims. (Cl. 24—116)

My present invention relates to the jewelry art and more particularly to an end connector for molded strands of beads.

The principal object of the present invention is to provide an end connector that can be quickly and easily locked to one or more strands of molded type beads.

Another object of the present invention is to provide an end connector for molded strands of beads which can be stamped from sheet stock in a single integral construction.

Another object of the present invention is to provide an end connector for strands of molded beads which can be easily and quickly locked to the beads with a minimum of manual labor.

A further object of the present invention is to provide an end connector for strands of molded beads which eliminates the time and labor normally required for attaching an end connector to such beads.

Another object of the present invention is to provide an end connector for strands of molded beads which can be stamped quickly from sheet stock and is easy and economical to manufacture and assemble.

With the above and other objects and advantageous features in view my invention consists of a novel arrangement of parts more fully disclosed in the detailed description following in conjunction with the accompanying drawings and more particularly defined in the appended claims.

Figure 1:
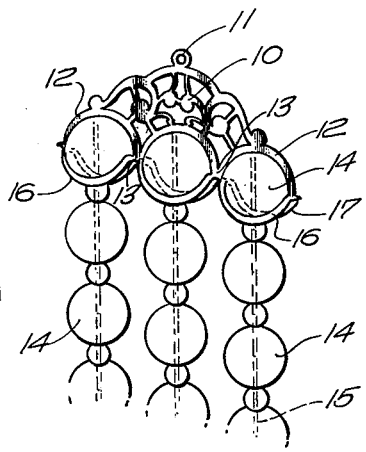
FIG. 1 is a perspective view of an end connector of the present invention attached to multiple strands of molded beads.

Imitation pearls and similar plastic beads have conventionally been strung loosely on suitable cords. When connectors are applied to one or more strands provision must be made for fastening the end of the cord and tieing the strands to the connector. More recently some types of imitation pearls and beads have been molded from plastic directly on to the cord, usually nylon. In such cases the individual beads are firmly attached to the cord and do not slide. Special end connectors must therefore be provided for attachment. The usual procedure is to insert a hot pin into the last bead to burn away a portion of the nylon cord and allow a wire to be inserted which can be looped over an end connector. This requires several manual operations and a considerable length of time. There is also a great deal of spoiled pieces caused by careless burning. Where more than one strand of beads are to be used the cost mounts considerably.

The present invention is designed to provide an end connector for molding strands of beads which eliminates most of the manual labor and provides a connector which can be made simply and cheaply and assembled very rapidly. The end connector of the present invention can be readily designed for one or more strands of beads. For purposes of illustration I have shown the present invention applied to a three strand connector. Referring more in detail to the drawings, the connector is preferably stamped from flat stock and comprises an upper portion 10 which may be ornamented as illustrated and is surmounted by an integral loop 11 for attachment to a chain or clasp. Depending from the portion 10 are a plurality of intergral semicircular members 12, three being illustrated. Each member 12 is integrally joined to the adjacent member 12 at points 13. The beads 14 are molded on suitable cords 15 and the end bead of each strand is positioned within one of the semicircular portions 12.

Figure 2:
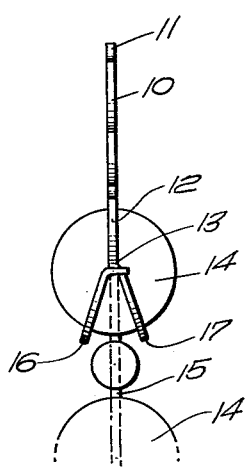
FIG. 2 is a side elevation of the same.

Each end bead is locked in position by a pair of integrally semicircular depending portions 16 and 17 depending from the lower ends of the portions 12 as shown in FIGS. 1 and 2. Viewing FIG. 2, the portions 16 and 17 are bent downwardly towards each other so as to form an acute angle in an inverted V when viewed from the side. They thus serve to lock the bead 14 in position, the spacing being such that the end beads will have a slight play to permit swiveling and lateral movement. The entire construction is in a single integral piece easily assembled with the beads.

Figure 3:
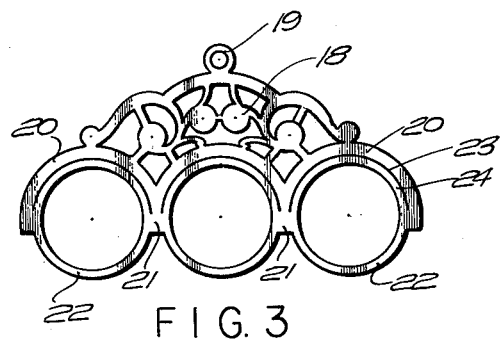
FIG. 3 is an enlarged plan view of the connector before the initial bending operation.
Figure 4:
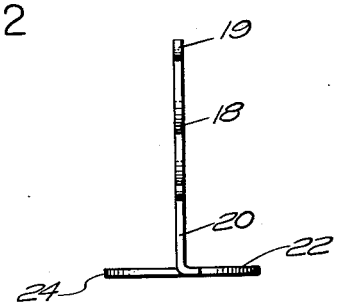
FIG. 4 is an end view of the connector shown in FIG. 3 after the initial bending operation.

The method of manufacture and assembly is quite simple. FIGS. 3 and 4 illustrate the formation of the end connector with three strands shown in FIGS. 1 and 2. Again it must be understood that this is for purposes of illustration only since the connector can easily be made for a single strand or any number of strands. A sheet of flat stock is punched out on a power press as shown in FIG. 3 with the ornamental portion 18, loop 19, and three wide semicircular portions 20 connected by thick portions 21. Each semicircular portion 20 is provided with a thin integral semicircular portion 22 at the bottom which completes a circle of slightly larger diameter than one of the beads 14. A semicircular cut 23 is made in each portion 20 extending around the upper part of the heavy portion but short of the ends. The above blank can be stamped with a multi-staged tool in an automatic press.

The final stage of the tool bends the portions 22 rearwardly at right angles to the blank and bends the portions 24 formed by the cut 23 forwardly at right angles into the position shown in FIG. 4. The blank now comprises a body portion in a single integral construction with the loop 19 at the top, the ornamental connecting portion 18 below and the semicircular portions 20 below that all in vertical alignment. At the bottom end at right angles to the above the portions 22 and 24 form a circle of slightly larger diameter than the beads. The end connectors are then provided to the assembler in the form shown in FIG. 4. To attach the connector to the beads, the end bead is pushed through the circle from the bottom up against the semicircular portion 20 and the portions 22 and 24 are then bent downwardly towards each other to form the portions 16 and 17 shown in FIG. 2. This last bending operation can be performed manually or with a suitable hand tool or in a foot press with a simple bending tool.

The end connector can thus be formed into the form shown in FIG. 4 by an automatic power press operation at high speed. The insertion of the bead and the bending of the portions 22 and 24 are the only manual operations required. The end connector can thus be manufactured rapidly and cheaply and its assembly with the bead strands is greatly facilitated. All spoilage of the beads is eliminated. A simple one strand loop can be formed suitable for an earring pendant or similar ornament. The connector can be made with any number of strands. Thus a single integral construction stamped from sheet stock forms a locking cage for the end beads. Other advantages of the present invention will be readily apparent to a person skilled in the art.

I claim:

1. A connector for molded beads comprising a semicircular bar adapted to extend around the upper periphery of a bead, means extending integrally from the ends of said semicircular bar and around the lower periphery of the bead to lock the bead to the connector, and an integral ornamental connecting portion extending from said bar, said connecting portion terminating in an integral connecting loop, said connector having interconnected with said first bar a plurality of adjacent bars and locking means for retaining a plurality of other beads, said first bar, said first locking means, said adjacent bars, and said adjacent locking means retaining a plurality of strands of molded beads.

2. A connector for molded beads comprising a semicircular bar adapted to extend around the upper periphery of a bead, means extending integrally from the ends of said semicircular bar and around the lower periphery of the bead to lock the bead to the connector, and an integral ornamental connecting portion extending from said bar, said connecting portion terminating in an integral connecting loop, said means comprising a pair of semicircular bar portions extending downwardly at an acute angle to each other, said connector having interconnected with said first bar a plurality of adjacent bars and locking means for retaining a plurality of other beads, said first bar, said first locking means, said adjacent bars, and said adjacent locking means retaining a plurality of strands of molded beads.

3. A connector for a bead molded on a string comprising a semicircular bar, an integral ornamental connecting portion extending from said bar, said connecting portion terminating in an integral connecting loop, and a pair of semicircular bars extending in opposite directions from the ends of said semicircular bar to form an integral ring at right angles thereto, whereby said pair of bars may be bent downwardly toward each other when a bead is positioned in said ring to lock the bead to the connector.

4. A connector for a bead molded on a string comprising a semicircular bar, an integral ornamental connecting portion extending from said bar, said connecting portion terminating in an integral connecting loop, and a pair of semicircular bars extending in opposite directions from the ends of said semicircular bar to form an integral ring at right angles thereto, whereby said pair of bars may be bent downwardly toward each other when a bead is positioned in said ring to lock the bead to the connector, said connector having interconnected with said first bar a plurality of adjacent bars and locking means for retaining a plurality of other beads, said first bar, said first locking means, said adjacent bars, and said adjacent locking means retaining a plurality of strands of molded beads.

References Cited in the file of this patent

UNITED STATES PATENTS

| 289,912 | Huleu | Dec. 11, 1883 |
| 398,902 | Payne | Mar. 5, 1889 |
| 1,425,336 | Prevot | Aug. 8, 1922 |
| 1,662,665 | Gagnon | Mar. 13, 1928 |

FOREIGN PATENTS

| 404,005 | France | Oct. 8, 1909 |
| 746,492 | France | Mar. 7, 1933 |
| 1,003,806 | France | Nov. 21, 1951 |